US006925842B1

(12) United States Patent
Hillabush et al.

(10) Patent No.: US 6,925,842 B1
(45) Date of Patent: Aug. 9, 2005

(54) KING PIN LOCK DEVICE

(76) Inventors: Duane E. Hillabush, 7019 Elizabeth Ct., Valley Springs, CA (US) 95252; Kenneth G. Gustafson, P.O. Box 1204, Pine Grove, CA (US) 95665

( * ) Notice: Subject to any disclaimer, the term of this patent is extended or adjusted under 35 U.S.C. 154(b) by 0 days.

(21) Appl. No.: 10/783,576

(22) Filed: Feb. 19, 2004

(51) Int. Cl.⁷ ............................................. B60R 25/00
(52) U.S. Cl. ................... 70/14; 70/56; 70/232; 70/258; 280/507
(58) Field of Search ............................... 70/14, 54–56, 70/58, 258, 229–232, 417; 280/507, 514, 280/432, 433

(56) References Cited

U.S. PATENT DOCUMENTS

| | | | |
|---|---|---|---|
| 2,641,124 A | 6/1953 | Gallagher et al. ............. | 70/232 |
| 2,785,564 A * | 3/1957 | Rossi ........................... | 70/232 |
| 3,415,085 A | 12/1968 | Ehle, Jr. ....................... | 70/232 |
| 3,600,914 A | 8/1971 | Johnson et al. ............... | 70/232 |
| 3,763,675 A | 10/1973 | Hofmeister et al. .......... | 70/232 |
| 3,798,938 A * | 3/1974 | McCullum ................... | 70/417 |
| 3,832,872 A | 9/1974 | Gerlach ....................... | 70/232 |
| 3,922,897 A | 12/1975 | Mickelson ................... | 70/232 |
| 4,031,727 A | 6/1977 | De Groat et al. ............. | 70/232 |
| 4,039,202 A | 8/1977 | Bamettler ................... | 280/507 |
| 4,141,233 A | 2/1979 | Reyes ........................... | 70/232 |
| D254,121 S | 2/1980 | Padgett, Jr. .................. | D8/331 |
| D279,351 S | 6/1985 | Lassiter ....................... | D8/331 |
| 4,553,415 A | 11/1985 | Maffey ........................ | 70/232 |
| 4,620,718 A | 11/1986 | Mickelson .................. | 280/507 |
| 4,704,883 A | 11/1987 | Dykes ......................... | 70/232 |
| 4,841,756 A | 6/1989 | Curtis .......................... | 70/232 |
| 4,882,921 A | 11/1989 | Wopinski ..................... | 70/232 |
| 5,052,203 A | 10/1991 | Van Cuyk .................... | 70/232 |
| 5,136,863 A | 8/1992 | Richardson ................... | 70/14 |
| 5,195,339 A * | 3/1993 | Nee et al. ..................... | 70/14 |
| 5,214,945 A | 6/1993 | Martin ........................ | 70/232 |
| 5,259,223 A | 11/1993 | Nee ............................ | 70/232 |
| 5,297,407 A | 3/1994 | Tarr ............................ | 70/232 |
| 5,351,511 A | 10/1994 | Bernier ........................ | 70/232 |
| 5,410,893 A | 5/1995 | Easterwood .................. | 70/14 |
| 5,491,992 A | 2/1996 | Mandall ..................... | 70/232 |
| 5,937,679 A | 8/1999 | Villalon, Jr. .................. | 70/58 |
| D414,675 S | 10/1999 | Niswanger ................... | D8/333 |
| 5,987,938 A | 11/1999 | Frei ............................ | 70/14 |
| 6,161,402 A | 12/2000 | Moore ......................... | 70/14 |
| 6,244,614 B1 * | 6/2001 | Bonvillain et al. .......... | 280/507 |
| 6,467,317 B1 | 10/2002 | Hillabush et al. ............. | 70/56 |
| 6,761,050 B2 * | 7/2004 | Rosenberg .................... | 70/14 |

* cited by examiner

*Primary Examiner*—Lloyd A. Gall
(74) *Attorney, Agent, or Firm*—Intellectual Property Law Group LLP; Otto O. Lee; Juneko Jackson

(57) ABSTRACT

An embodiment of the present invention is a king pin lock device that prevents theft of trailers and other objects equipped with a king pin trailer hitch. The lock device has a lock body with a first end and a second end. The second end has a moveable lock bar to engage and disengage the king pin sitting in the first end, and an internal aperture to receive a conventional round puck lock or other suitable lock or locking mechanism. The puck lock is locked onto an immobile retaining bar on the lock body and secures the lock body onto the king pin, preventing any attempt to access the king pin trailer hitch. The puck lock is protected by a perimeter wall surrounding it in the second end of the lock body. The perimeter wall has a key insert window for user access to the keyhole of the puck lock.

28 Claims, 4 Drawing Sheets

KING PIN LOCK DEVICE

BACKGROUND OF THE INVENTION

1. Field of Invention

The present invention relates to a king pin lock device. More particularly, the present invention relates to a device for preventing theft of trailers equipped with a king pin hitch.

2. Background

Trailers and equipments employing the king pin trailer hitch are susceptible to theft. They are easily stolen by being attached to and towed by a vehicle having an appropriate connection to the hitch.

Other devices have been employed in an attempt to prevent the theft of objects equipped with a king pin hitch. However, users do not have faith in current products. For example, for certain "tea cup" style king pin locks, a truck can simply back into the device with enough force and still connect to the trailer and steal it.

Additionally, many of the existing king pin locks have exposed parts that are easy to defeat with common burglary tools such as pry bars, bolt cutters, sledgehammers, torches, and hacksaws. Furthermore, existing king pin locks engage the king pin only on one side.

Some of the existing devices are too costly to manufacture. They have many parts, which add to their expense.

There is a need to provide a king pin trailer hitch lock that is simpler to make, simpler to use, and harder to defeat. It is desirable to provide a king pin trailer hitch lock which does not leave the lock or locking mechanism exposed for easy access. Additionally, it is desirable to provide a king pin trailer hitch lock that is larger than others on the market, making it more difficult to force a connection between a trailer and truck. Finally, it is desirable to provide a king pin trailer hitch lock that is very durable yet inexpensive to produce.

SUMMARY OF INVENTION

In one embodiment of the present invention, the lock device is made of a lock body having a first end and second end. The lock device can be made of stainless steel, aluminum, iron, titanium, or any alloy thereof or other suitable materials. The lock body is large enough to prevent a forced connection between truck and trailer, completely covering the king pin hitch, yet not so large as to make it difficult to install the device onto the hitch.

In another embodiment the first end has an internal circular aperture in which fits a given king pin hitch. Inside the internal circular aperture of the first end is an inner flange to engage the king pin. The other side of the king pin in engaged by a lock bar that slides into place to secure the king pin in the lock body. Thus, instead of only engaging the king pin hitch on just one side, it is engaged on more than one side, making a stronger connection between the lock device and the hitch.

In yet another embodiment the second end has a circular aperture in which fits a lock. There is a retaining bar in the circular aperture that is immobile and contains a hole through its center in which the lock engages. The lock when engaged secures the lock bar that is moveable with respect to the lock body, locking the king pin hitch.

In still another embodiment of the present invention, the circular aperture of the second end engulfs a round puck lock with a step to secure, such that upon locking the round puck lock, the king pin hitch is secured between the moveable bar and the inner flange in the first end. The round puck lock is a common item, also known as a step-in-lock, used mainly in the vending business.

In another embodiment of the present invention, the round puck lock is surrounded by a perimeter wall to hide the lock connection. The lock mechanism is not visible and not exposed to tools to defeat it.

In yet another embodiment of the present invention, the lock device is made of a material with a predetermined strength, such that cutting through the device is made very difficult.

In still another embodiment of the present invention, there is a bright tag attached to the lock device to warn against accidental backing into the king pin hitch in its locked state.

Therefore, the present invention satisfies the long-felt need to provide a king pin trailer hitch lock device that is durable, easy to manufacture, easy to use, and hard to defeat. The lock is large enough to prevent theft by forcing a connection between a truck and trailer, and the king pin hitch is engaged on more than one side for a stronger connection. Finally, it has few parts, which makes it less expensive to manufacture.

These and other embodiments of the present invention are further made apparent, in the remainder of the document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

The present invention addresses all of the concerns mentioned above. A preferred embodiment of the present king pin lock device is made of stainless steel with substantial thickness such that it would take an enormous amount of time to cut through and defeat with a hacksaw or chainsaw. The present invention can also be made of other metals such as aluminum, iron, titanium, or any of the alloys thereof.

There are no exposed areas that could be susceptible to bolt cutters to disengage the locking mechanism. Prying devices have no significant area of opportunity in which to apply pressure to the present invention.

The embodiment of the instant lock device protects the locking mechanism itself. The round puck lock itself is encompassed by the device and the locking shaft is hidden from view. The lock is not exposed to threats of prying or cutting.

Figure 1:
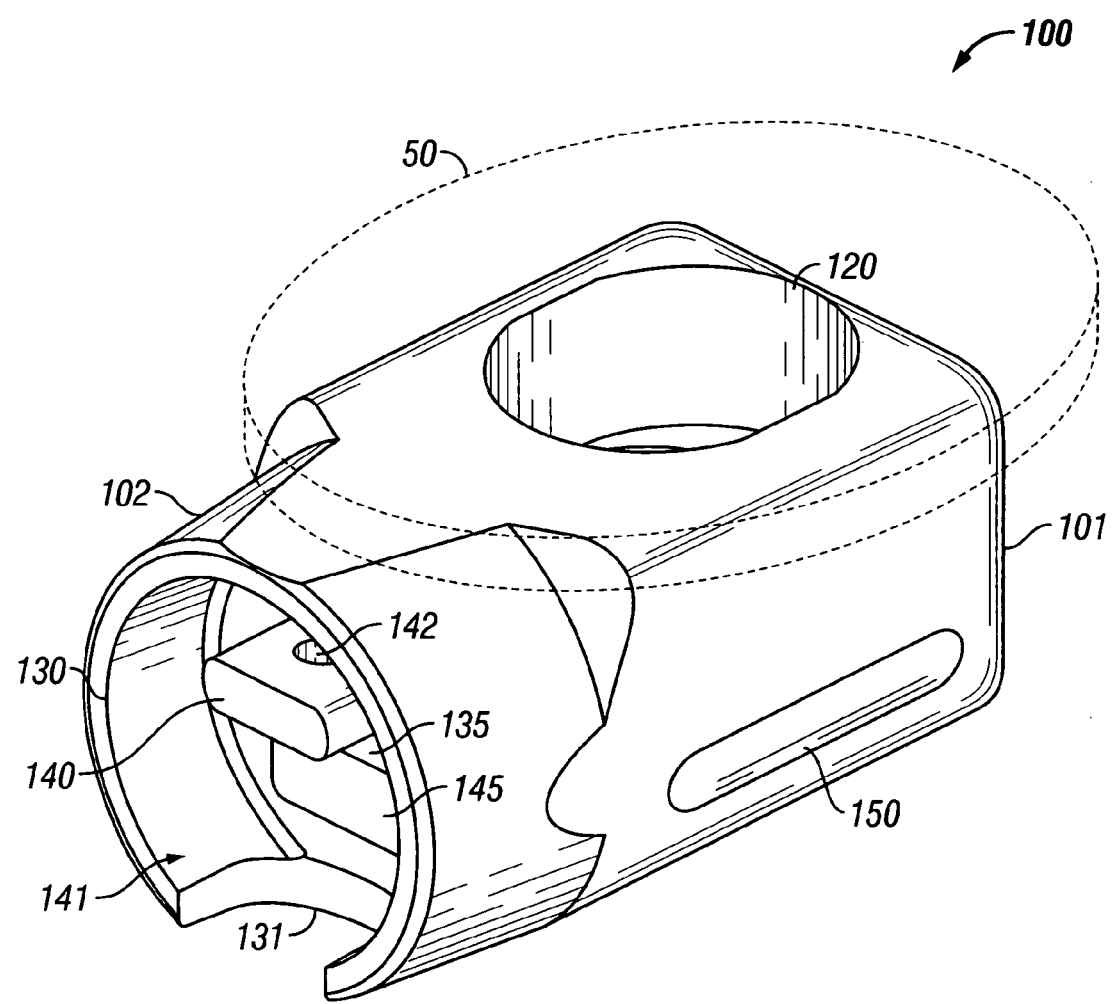
FIG. 1 illustrates a perspective view of an embodiment of the lock body of the present invention that is engaged with a king pin trailer hitch.

In FIG. 1, a lock body 100 is shown in its engaged form fitted over a king pin trailer hitch 50 drawn in broken lines. The lock body 100 engages the king pin trailer hitch 50 in a manner such that the king pin 50 is completely covered by the lock body 100, and, once locked in place by a lock or locking device (such as the round puck lock 20 shown in FIGS. 4, 5A and 5B), any attempt to engage the king pin trailer hitch 50 is prevented.

Figure 4:
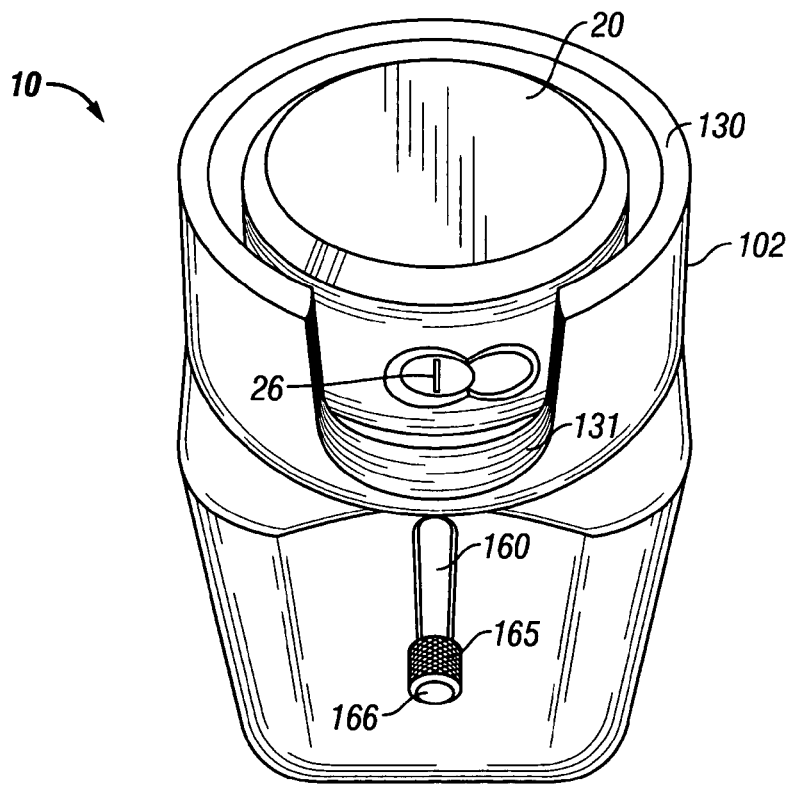
FIG. 4 illustrates a bottom perspective view of an embodiment of the lock device in the engaged position, with the lock body and puck lock in a locked position.

In this embodiment, the lock body 100 has a first end 101 and a second end 102. The first end contains an internal chamber 120 capable of receiving a king pin 50. The second end 102 has a second end perimeter wall 130, and an internal aperture 141 capable of receiving a lock or locking device (such as the round puck lock 20 shown in FIGS. 4, 5A and 5B). The second end perimeter wall 130 is of sufficient diameter to accommodate and surround a conventional round puck lock 20 shown in FIGS. 5A and 5B. Within the internal aperture 141 is an inner surface 135 that is shaped in a corresponding manner to the bottom 25 of the round puck lock 20 shown in FIGS. 5A and 5B such that the round puck lock 20 fits into the second end 102 when the lock body 100 is in its engaged state (FIGS. 1, 2, and 4).

Within the internal aperture 141 is a retaining bar 140 that is immobile with respect to the lock body 100. The retaining bar 140 has a hole 142 in which the lock or locking mechanism can engage. The second end perimeter wall 130 has a key insert window 131 to provide access to the lock or locking device that fits into the internal aperture 141 of the second side 102 of the lock body 100. In this embodiment, the internal aperture 141 and retaining bar 140 are designed to fit a conventional round puck lock, such as the round puck lock 20 shown in FIGS. 4, 5A and 5B, or another suitable lock or locking device. The second end perimeter wall 130 and inner surface 135 are shaped in a corresponding manner to the round puck lock 20 and bottom 25 of the round puck lock such that a secure juncture between the round puck lock and the second end 102 at its inner surface 135 is made possible. The round puck lock 20 and shape of the second end 102 hinder any attempts to tamper with the locking mechanism. The round puck lock 20 fits into the internal aperture 141 of the second end 102 of the lock body 100, and the retaining bar 140 fits into the lock insert 24 of the round puck lock, with the bolt 21 of the puck lock 20 fitting through the hole 142 of the retaining bar 140 when the puck lock 20 is engaged in the lock body 100 (see FIGS. 5A and 5B).

The edges of the lock body 100 are formed such that the lock body 100 when engaging a king pin hitch 50 cannot be attached to a pulling device by a potential thief. There are also optional grooves 150 on the lock body 100 for ease of handling during use.

Figure 2:
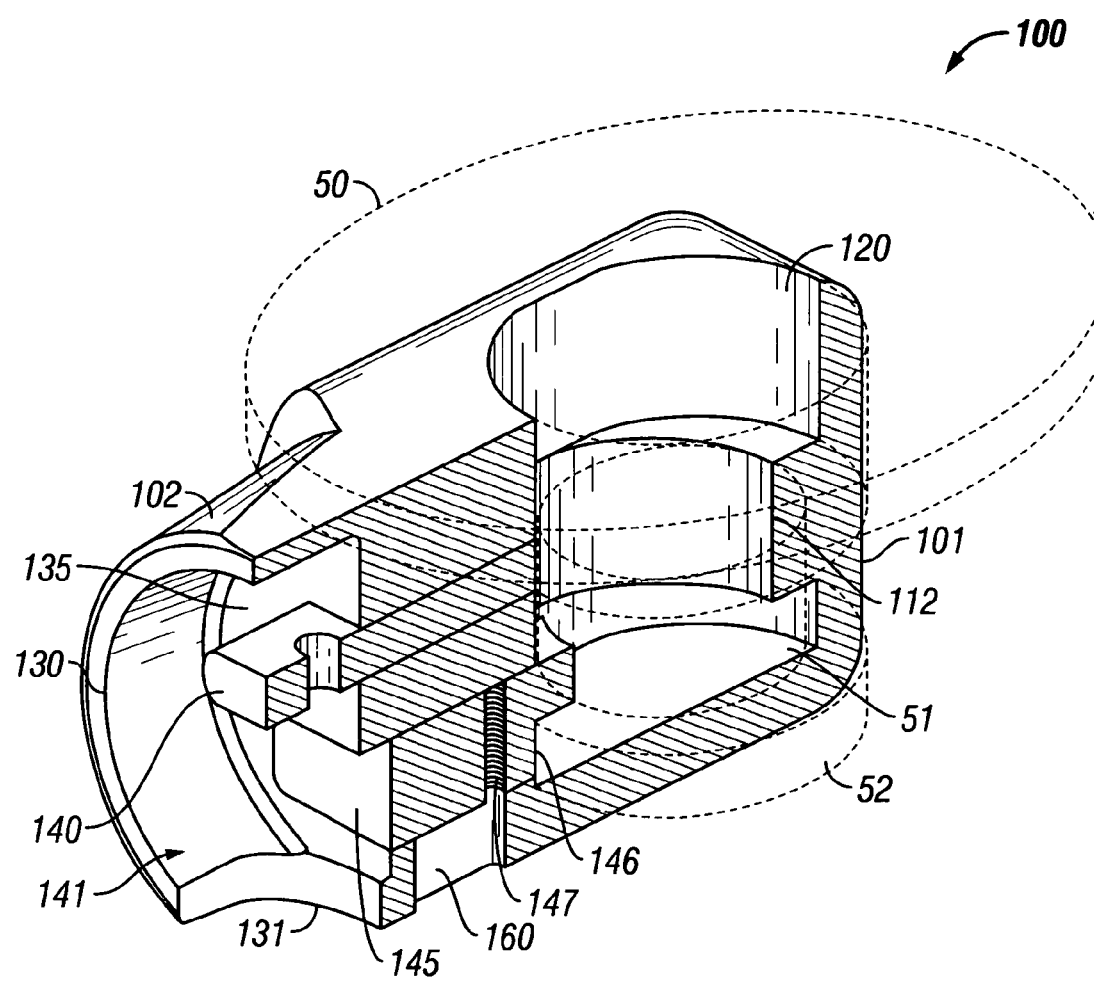
FIG. 2 illustrates a cross sectional perspective view of FIG. 1 engaged with a king pin trailer hitch.

FIG. 2 shows a cross-sectional perspective view of a lock body 100 of an embodiment of the present invention engaged with a king pin 50 (shown in broken lines). The lock body 100 comprises a first end 101 and a second end 102. The internal chamber 120 of the first end 101 is of a sufficient size larger than a diameter of a given king pin hitch 50, allowing the hitch to enter the chamber 120 and be engaged by the lock body 100. The first end 101 of the lock body 100 has an inner flange 112 protruding into the internal chamber 120 to engage the king pin 50. The king pin 50 is also engaged and held firmly against the inner flange 112 in the lock body 100 by the lock bar 145 upon engagement. In this embodiment the lock bar 145 has a concave edge 146 proximal to the internal chamber 120 such that the longer portion of the edge of the lock bar fits into the annular groove 51 of the king pin 50, while the shorter portion of the edge of the lock bar fits onto a lower annular surface 52 of the king pin 50.

The lock bar 145 is moveable with respect to the lock body 100 to engage and disengage the king pin hitch 50. A setscrew 165 or similar rod-like structure, such as a screw, nail, bolt, etc., can be secured to the lock bar 145 at a threaded setscrew hole 147 to move the lock bar 145 to its engaged and disengaged positions (see FIG. 4). The setscrew 165 protrudes through a slot 160 in the lock body 100 for user access.

The second end 102 has an internal aperture 141 surrounded by a second end perimeter wall 130. The internal aperture 141 contains a retaining bar 140 that is immobile with respect to the lock body 100. The retaining bar 140 has a hole 142 (FIG. 1) to receive the locking mechanism of a suitable lock such as the conventional round puck lock 20 shown in FIGS. 4, 5A and 5B.

Figure 3:
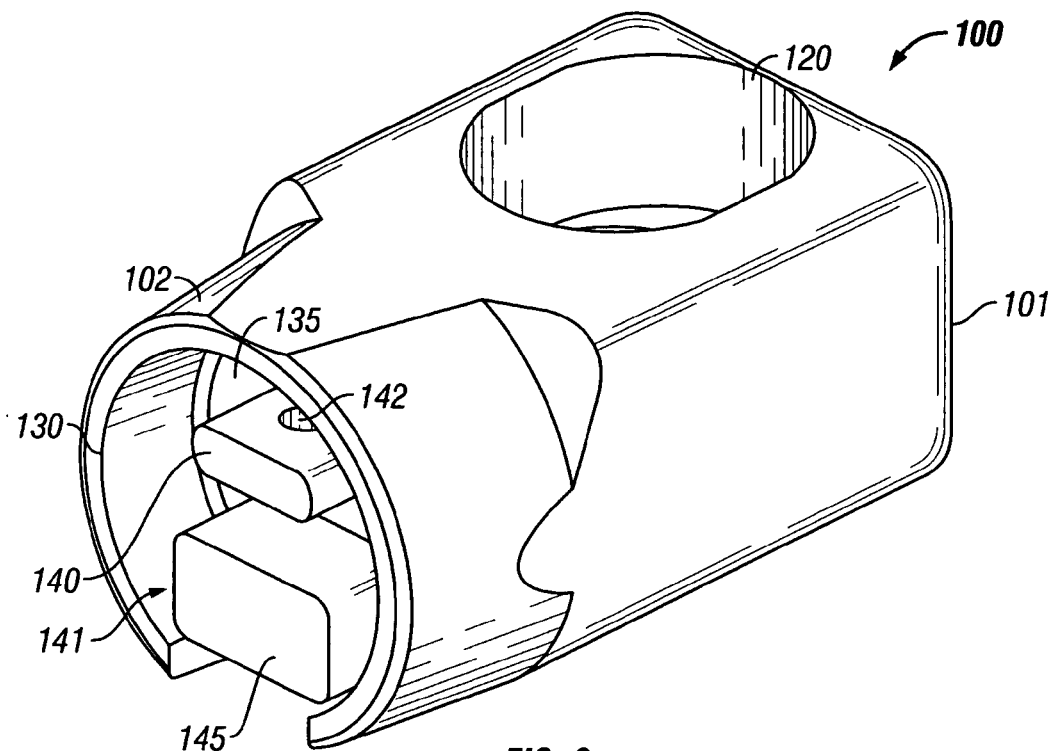
FIG. 3 illustrates a perspective view of an embodiment of the device not engaged with a king pin trailer hitch.

FIG. 3 shows a perspective view of an embodiment of the present invention in its disengaged state. The lock body 100 has a first end 101 and a second end 102. In its disengaged state the moveable lock bar protrudes into the internal circular aperture 141 of the second end 102 of the lock body 100.

FIG. 4 illustrates a bottom perspective view of an embodiment of the present invention shown in its engaged position, having a puck lock 20 in a locked position secured to the second end 102 of the lock body 100. The second end perimeter wall 130 encompasses the round puck lock 20 when the puck lock 20 is inserted in the internal circular aperture 141 of the second end 102, such that the second end perimeter wall 130 protects the puck lock, and the extending lock mechanism 22 of the puck lock 20 is hidden from view when the puck lock is in a locked state 20 in the lock device 10 (see FIGS. 5A and 5B). The puck lock 20 is not exposed to any threats of prying or cutting. The second end perimeter wall 130 has a key insert window 131 to provide the user access to the key hole 26 of the extended lock mechanism 22 of the conventional round puck lock 20.

The lock body 100 also has a slot 160 through which a setscrew or similar rod-like structure 165 protrudes. The setscrew 165 is secured to the lock bar 145 (see FIG. 2) at a threaded setscrew hole 147 in the lock bar 145 and allows the user to move the lock bar 145 to engage and disengage the king pin 50. The setscrew 165 has a head 166 that has a larger diameter than the width of the slot 160 in the lock body 100. The threaded setscrew hole 147 (FIG. 2) is deep enough so that the setscrew 165 can be screwed down by the user on to the lock body 100 to secure the lock bar 145 in a given position along its path of movement defined by the slot 160. Optionally, attached to the set screw 165 is a bright-colored tag, or other bright colored attachment, to warn against accidental backing up of a truck into the locked kingpin (not shown).

Figure 5A:
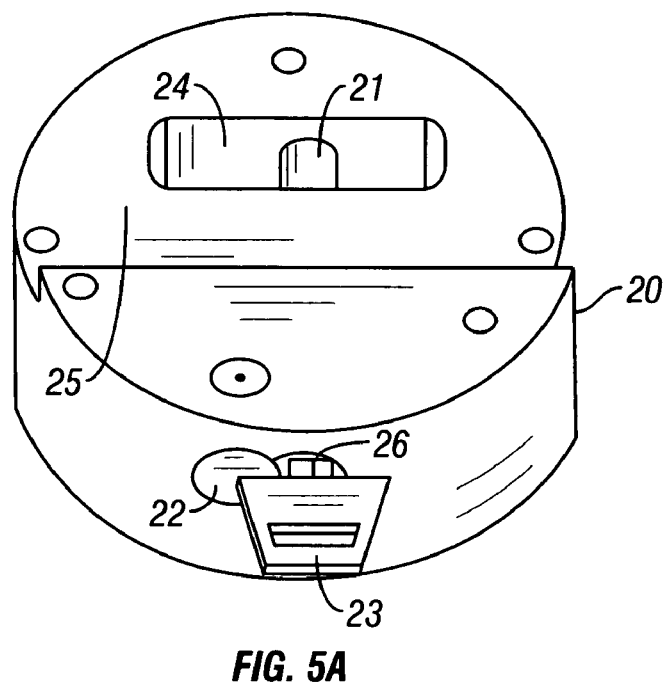
FIG. 5A illustrates the bottom perspective view of a round puck lock that is used in conjunction with the present invention, in its locked state.
Figure 5B:
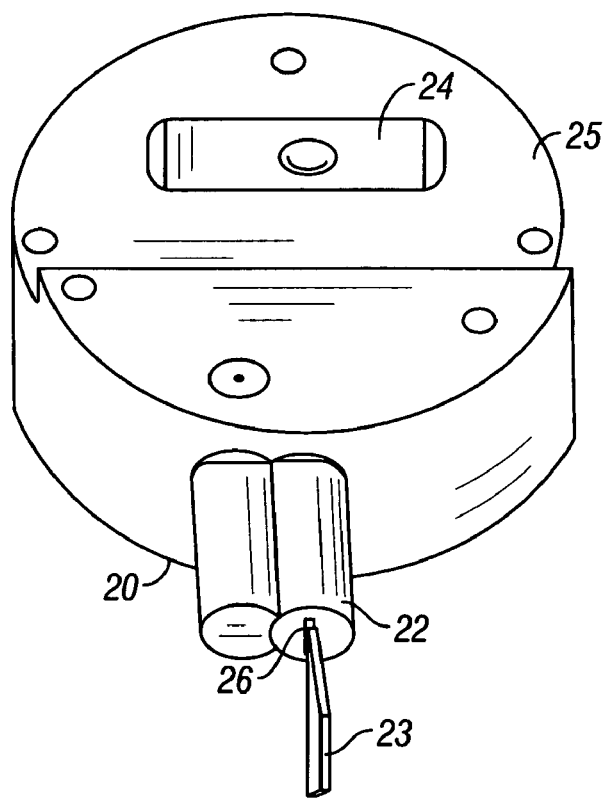
FIG. 5B illustrates the bottom perspective view of a round puck lock that is used in conjunction with the present invention, in its unlocked state.

FIG. 5A shows a bottom view of a conventional round puck lock 20 in a locked state, while FIG. 5B shows a bottom view of a round puck lock 20 in an unlocked state. The round puck lock 20 engages with the retaining bar 140 of the lock body 100 of the present invention at a lock insert 24 (see FIG. 1). The inner surface 135 of the internal aperture 141 of the second end 102 of the lock body 100 is shaped such that it accommodates the bottom 25 of round puck lock 20 to form a secure juncture (see FIG. 1). The retaining bar 140 of the second end 102 of the lock body 100 is received by the lock insert 24 of the round puck lock 20 in this embodiment. The round puck lock 20 secures the lock body 100 in an engaged position (FIGS. 1, 2, and 4) when a key 23 is used to engage an extending lock mechanism 22, such that a bolt 21 protrudes through the lock insert 24 and secures the puck lock 20 to the lock device 100 by the bolt 21 passing through the hole 142 in the retaining bar 140 of the second end 102 of the lock body 100.

A preferred embodiment of the lock body 100 is made of stainless steel with substantial thickness that it is structurally extremely strong, and would take an enormous amount of time to cut through with a hacksaw or chainsaw. The lock body 100 can also be made of other metals such as aluminum, iron, titanium, or any alloy thereof.

In the lock device's engaged form, there are no exposed areas which render the round puck lock 20 susceptible to bolt cutters. Prying devices have no significant area of opportunity in which to apply pressure to the present invention in order to disengage or remove the round puck lock 20.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments of the foregoing description, but rather is indicated by the appended claims. All changes that come within the meaning and range of equivalents within the claims are intended to be embraced within the spirit and scope of the claims.

What is claimed is:

1. A lock device comprising: a lock body with a first end and a second end;
   a. said first end having:
      i. an internal chamber capable of receiving a king pin;
   b. said second end having:
      i. a second end perimeter wall;
      ii. an internal aperture capable of receiving a locking mechanism;
      iii. a lock bar that is moveable with respect to the lock body; and
      iv. a retaining bar that is immobile with respect to the lock body, and having a hole;
   wherein, the lock bar is moveable to engage and disengage the king pin sitting in the internal chamber and the hole in the retaining bar engages with the locking mechanism to hold the lock bar against the king pin, such that engaging the locking mechanism in its locked position prevents access to the king pin.

2. The lock device as in claim 1 having a key insert window in said second end perimeter wall.

3. The lock device as in claim 1 wherein the lock bar that is moveable has a concave edge proximal to the internal chamber of the first end to fit into an annular groove of the king pin.

4. The lock device as in claim 1 wherein the lock bar has an edge proximal to the internal chamber, the edge having a longer portion and a shorter portion, such that the longer portion fits into an annular groove of the king pin, while the shorter portion fits onto a lower annular surface of the king pin.

5. The lock device as in claim 1 wherein the lock bar is made of cast iron, aluminum, or cast alloys.

6. The lock device as in claim 1 wherein the retaining bar is made of cast iron, aluminum, or cast alloys.

7. The lock device as in claim 1 wherein the lock body is made of cast iron, aluminum, or cast alloys.

8. The lock device as in claim 1 wherein the second end of the lock body engulfs a conventional round puck lock, such that upon locking said conventional round puck lock, said conventional round puck lock engages the retaining bar and holds the lock bar against the king pin in its engaged position.

9. The lock device as in claim 1 having a rod or rod-like structure that protrudes through a slot in the lock body, said rod being secured to the lock bar and sliding with respect to the lock body.

10. The lock device as in claim 1 having a setscrew that protrudes through a slot in the lock body, said setscrew being screwed into a threaded setscrew hole in the lock bar, and sliding with respect to the lock body.

11. The lock device as in claim 10 wherein the setscrew has a head having a larger diameter than a width of the slot in the lock body, and the threaded setscrew hole in the lock bar is deep enough to allow the setscrew to be screwed down onto the lock body and secure the lock bar in a desired position along its path of movement defined by the slot in the lock body.

12. The lock device as in claim 1 adapted to receive a bright-colored member to warn that the lock is in place on the king pin.

13. The lock device as in claim 11 having a bright-colored member to the head of the setscrew to warn that the lock is in place on the king pin.

14. The lock device as in claim 1 wherein the first end of the lock body has grooves on opposite sides of its outer surface for gripping the lock body.

15. A lock device comprising: a lock body with a first end and a second end;
   a. said first end having:
      i. an internal circular chamber capable of receiving a king pin, including an inner flange to selectively engage an annular groove of the king pin;
   b. said second end having:
      i. a perimeter wall;
      ii. an internal aperture capable of receiving a lock or locking mechanism;
      iii. a lock bar that is moveable with respect to the lock body; and
      iv. a retaining bar that is immobile with respect to the lock body, and having a hole;
   wherein, the lock bar is moveable to engage and disengage the king pin sitting in the internal circular chamber in cooperation with the inner flange to selectively engage the annular groove of the king pin, and the hole in the retaining bar engages with the lock or locking mechanism whereby the lock or locking mechanism holds the lock bar against the king pin in its engaged position, preventing access to the king pin.

16. The lock device as in claim 15 having a key insert window in said perimeter wall.

17. The lock device as in claim 15 wherein the lock bar that is moveable has a concave edge proximal to the internal chamber to fit into an annular groove of the king pin.

18. The lock device as in claim 15 wherein the lock bar has an edge proximal to the internal chamber, said edge having a longer portion and a shorter portion such that the longer portion fits into the annular groove of the king pin, while the shorter portion fits onto a lower annular surface of the king pin.

19. The lock device as in claim 15 wherein the lock bar is made of cast iron, aluminum, or cast alloys.

20. The lock device as in claim 15 wherein the retaining bar is made of cast iron, aluminum, or cast alloys.

21. The lock device as in claim 15 wherein the lock body is made of cast iron, aluminum, or cast alloys.

22. The lock device as in claim 15 wherein the second end of the lock body engulfs a conventional round puck lock, such that upon locking said conventional round puck lock, said conventional round puck lock engages the retaining bar and holds the lock bar against the king pin in its engaged position.

23. The lock device as in claim 15 having a rod or rod-like structure that protrudes through a slot in the lock body, said rod being secured to the lock bar and sliding with respect to the lock body.

24. The lock device as in claim 15 having a setscrew that protrudes through a slot in the lock body, said setscrew being screwed into a threaded setscrew hole in the lock bar, and sliding with respect to the lock body.

25. The lock device as in claim 15 adapted to receive a bright-colored member to warn that the lock is in place on the king pin.

26. The lock device as in claim 15 wherein the first end of the lock body has grooves on opposite sides of its outer surface for gripping the lock body.

27. The lock device as in claim 24 wherein the setscrew has a head having larger diameter than a width of the slot in the lock body, and the threaded setscrew hole in the lock bar is deep enough to allow the setscrew to be screwed down onto the lock body to secure the lock bar in a desired position along its path of movement.

28. The lock device as in claim 27 having a bright-colored member to the head of the setscrew to warn that the lock is in place on the king pin.

* * * * *